(12) United States Patent
Franzen

(10) Patent No.: US 6,172,319 B1
(45) Date of Patent: Jan. 9, 2001

(54) CAST MOUNT FOR INTERPOSITION BETWEEN AN ELECTRODE HOLDER AND METAL BURNING ELECTRODE FOR USE IN ELECTRICAL DISCHARGE MACHINING

(76) Inventor: Paul Franzen, 2923 Edelweiss Rd., Rockford, IL (US) 61109

(*) Notice: Under 35 U.S.C. 154(b), the term of this patent shall be extended for 0 days.

(21) Appl. No.: 09/246,477

(22) Filed: Feb. 9, 1999

(51) Int. Cl.[7] .............................. B23H 1/00; B23H 7/26; B23B 31/02

(52) U.S. Cl. ..................... 219/69.15; 279/83; 403/362

(58) Field of Search .................. 219/69.15, 68, 219/69.11; 279/83, 85, 86, 87, 14; 403/362

(56) References Cited

U.S. PATENT DOCUMENTS

| | | | |
|---|---|---|---|
| 3,588,135 | * 6/1971 | Porter | 279/83 |
| 4,449,027 | * 5/1984 | Fujikawa | 219/69.15 |
| 4,621,821 | 11/1986 | Schneider | 279/83 |
| 4,786,062 | 11/1988 | Schneider | 279/83 |
| 4,876,429 | * 10/1989 | Büchler | 219/69.15 |
| 4,924,051 | * 5/1990 | Sebzda, Sr. | 219/69.15 |
| 5,906,378 | * 5/1999 | Nordquist | 219/69.15 |
| 6,015,961 | * 1/2000 | Lozon et al. | 219/69.15 |

OTHER PUBLICATIONS

Pp. 8–15 of EROW A Systemoverview catalog, No publication date.
Pp. 66–104 of EROW A General Catalog, No publication date.

* cited by examiner

*Primary Examiner*—Geoffrey S. Evans
(74) *Attorney, Agent, or Firm*—Leydig, Voit, & Mayer, Ltd.

(57) ABSTRACT

A mount for interposition between an electrode holder and an electrode for electrical discharge machining (EDM). The mount is cast from material such as aluminum or zinc. The mount has a shank portion that is connectable to the electrode holder and a connector portion or tip portion that is connectable to the electrode. The tip portion has a gluing surface that is dimensioned to be glued with a corresponding surface on the electrode. A plurality of deformable ears cast onto the gluing surface of the mount project outward and deform in contact with the electrode when the electrode and the mount are connected and bonded by glue, to thereby provide good electrical contact therebetween. The tip portion may also include grooves cast therein for receiving glue thereby improving the glue bond strength between the electrode and the mount. The mount includes an axial passage to provide for dielectric fluid flow therethrough. The shank portion includes a recess increasing the number of contact points between the mount and the electrode holder. A raised lip may be cast into the mount around the axial passageway to act as a seal between the electrode holder and the mount to prevent leakage of dielectric fluid therebetween.

21 Claims, 4 Drawing Sheets

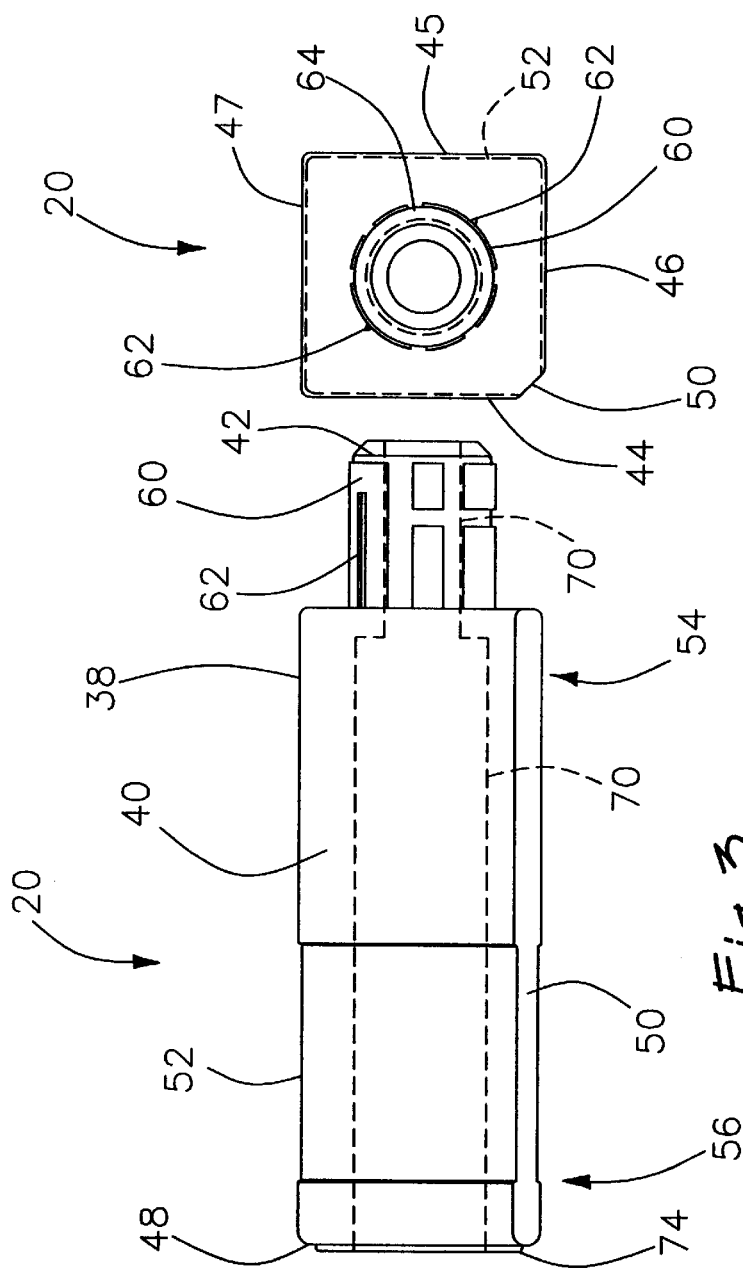
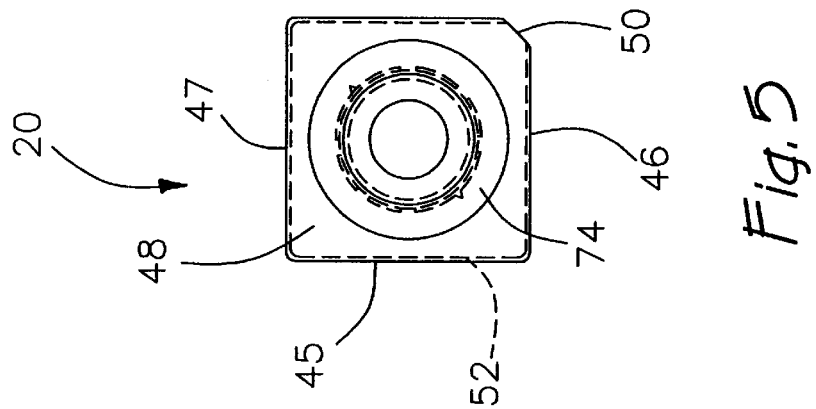

CAST MOUNT FOR INTERPOSITION BETWEEN AN ELECTRODE HOLDER AND METAL BURNING ELECTRODE FOR USE IN ELECTRICAL DISCHARGE MACHINING

FIELD OF THE INVENTION

The present invention relates generally to the art of tools for spark erosion or metal discharge machining, and more particularly to mounts for connecting electrode holders to die-sinking metal burning electrodes.

BACKGROUND OF THE INVENTION

There are a wide variety of applications that use spark erosion or electrical discharge machining (EDM) for high precision machining of a wide variety of conductive metals. The EDM process removes metal from a metal workpiece by using thermal energy produced from an accurately controlled electrical discharge spark to erode or vaporize metals. One type of electrical discharge machining is known as a die-sinking process in which the inverted image of a metal burning electrode is gradually impressed into the workpiece. The position of the electrode is typically driven and accurately controlled by a servo actuated ram. During an EDM process, the spark discharge is pulsed on and off at a high frequency cycle. Each spark discharge melts or vaporizes a small area of the workpiece surface. The melted metal particles are then cooled by the dielectric fluid in which the work piece is immersed in and then solidified into small erodable particles which are flushed away by the pressure and flow of the dielectric fluid. The impression of the electrode for each spark discharge is located in a very small area. The spark discharge typically travels the shortest distance across the narrowest gap through the dielectric fluid to the closest point on the workpiece thereby removing material at that location. The amount of material removed from the workpiece with each pulse is proportional to the energy contained in the pulse.

The advantages of EDM are well known, including the ability to remove material from workpieces that are very hard such as hardened steel or tungsten carbide with metal burning electrodes formed of soft conductive material such as copper with a tellurium pattern, or graphite. The EDM process is also highly precise and able to easily form complex patterns on a workpiece.

To interchangeably mount a variety of die-sinking electrodes on the ram, electrode holders and mounts are often used to releasably connect the electrodes to the ram. The electrode holder connects on the end of a ram. The mount is interposed between the electrode holder and the electrode. The mount typically includes a shank portion that is clamped into an opening of the electrode holder and a connector portion or tip portion which connects to the electrode.

As shown and described in a *General Catalogue* published by EROWA (1997), pages 78–100, a variety of mounts have been forged and/or machined from relatively hard conductive material including brass and steel material. A common way to connect a mount to the electrode is to machine threads on the tip portion of the mount which in turn screws into a tapped threaded hole formed in the electrode. It is also known to glue the mount directly on the electrode. For example, it is known to glue a closely machined smooth or slightly roughened cylindrical tip of the mount into a closely machined cylindrical hole in the electrode. It is a requirement that the mount be in good electrical contact with the electrode to facilitate communication of electricity therethrough for proper spark erosion of a work piece. The glue tends to act as an insulator and can cause problems in the EDM process when bad electrical contact exists. Therefore, close tolerances in the machining of the mounts has been necessary to ensure good electrical contact between the mount and the electrode. Even with closely machined tolerances, the glue can still occasionally cause poor electrical contact which is a significant disadvantage. Heretofore, prior mounts for interposition between an electrode holder and an electrode have suffered from being very expensive.

SUMMARY OF THE INVENTION

It is therefore the general objective of the present invention to provide a more economical mount for interposition between a metal burning electrode and an electrode holder.

In achieving this objective, it is a further object to maintain good electrical contact between a mount and a metal burning electrode.

Accordingly, the present invention is directed to a die cast mount for connecting a metal burning electrode to an electrode holder. The mount comprises a conductive body formed of cast material and includes a shank portion and a connector portion. The shank portion is sized to be received in an opening of the electrode holder for clamping therein and the connector portion is dimensioned for connecting to the metal burning electrode. Suitable cast material for the mount may be either aluminum material or zinc material. The fact that the mount is formed from an inexpensive cast material and does not require subsequent machining operations makes the mount of the present invention a very economical and inexpensive mount as compared with conventional brass or steel mounts.

It is an aspect of the present invention that the mount includes a gluing surface on the connector portion which is dimensioned to cooperate with a corresponding surface of the metal burning electrode. The mount may be connected to the metal burning electrode by gluing the gluing surface to the corresponding surface of the electrode.

It is another aspect of the present invention that the connector portion includes a plurality of deformable ears cast or formed thereon which project outwardly from the gluing surface. The deformable ears ensure electrical contact between the metal burning electrode and the mount. The deformable ears are dimensioned to deform in contact with the corresponding surface of the electrode when the mount and the electrode are connected. The relatively soft cast material of the ears allows the ears to easily deform and prevents the electrode from being damaged when a mount is tapped into the electrode.

It is a further aspect of the present invention that the gluing surface includes a plurality of grooves cast therein for receiving and retaining glue. When the mount is bonded to the metal burning electrode by glue, the glue that is received into the grooves improves both the axial strength and the radial strength of the glue bond between the mount and the electrode.

According to one embodiment, the connector portion of the mount is a cylindrical tip. The cylindrical tip includes a cylindrical gluing surface on the outer periphery thereof. The cylindrical surface is sized to be closely received in a cylindrical hole formed in the metal burning electrode. The cylindrical gluing surface includes at least one deformable ear projecting radially outward. The radius of the at least one deformable ear is sized slightly larger than the radius of the cylindrical hole so that it deforms in contact with the inner surface of the cylindrical hole when the mount and the electrode are connected to provide good electrical contact therebetween.

According to another embodiment, the connector portion includes a cylindrical tip having an internal cylindrical opening with the inner surface of the cylindrical opening providing a cylindrical gluing surface. Small electrodes such as pins or small rods may be inserted into the cylindrical opening and glued thereto. The cylindrical gluing surface includes at least one deformable ear projecting radially outward from the gluing surface which is radially inward toward the center of the cylindrical opening. The radius of the at least one deformable ear is sized smaller than the radius of the stem portion of the electrode so that when the electrode and mount are connected and bonded by glue, the deformable ear deforms in contact with the electrode to provide good electrical contact therebetween.

According to another embodiment of the present invention, the connector portion includes a tip having a longitudinally extending slot. The slot includes parallel side walls for receiving a blade portion of the metal burning electrode therebetween. The at least one deformable ear projects outwardly from the slot walls. The deformable ear provides a width between the slot walls that is smaller than the width of the blade portion of the electrode such that when the electrode and the mount are connected and bonded by glue, the ear will deform in contact with the electrode to provide good electrical contact between the electrode and the mount.

These and other aims, objectives, and features of the invention will become more apparent from the following detailed description when taken in conjunction with the accompanying drawings.

BRIEF DESCRIPTION OF THE DRAWINGS

FIG. 3 is a side view of the mount illustrated in FIG. 2.

FIG. 4 is a top view of the mount illustrated in FIG. 2.

FIG. 5 is a bottom view of the mount illustrated in FIG. 2.

Figure 1:
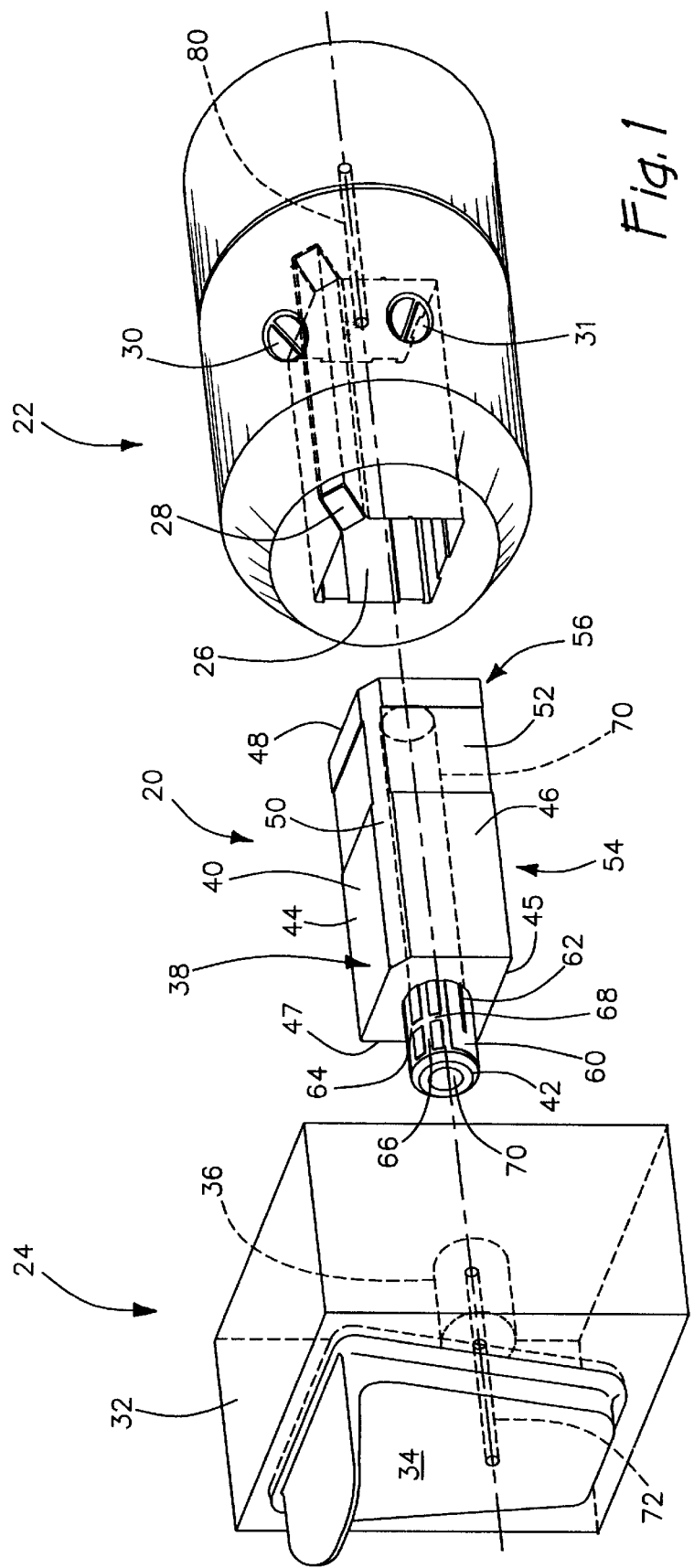
FIG. 1 is an exploded perspective view of a mount according to a preferred embodiment of the present invention interposed between an exemplary electrode holder and an exemplary metal burning electrode.
Figure 2:
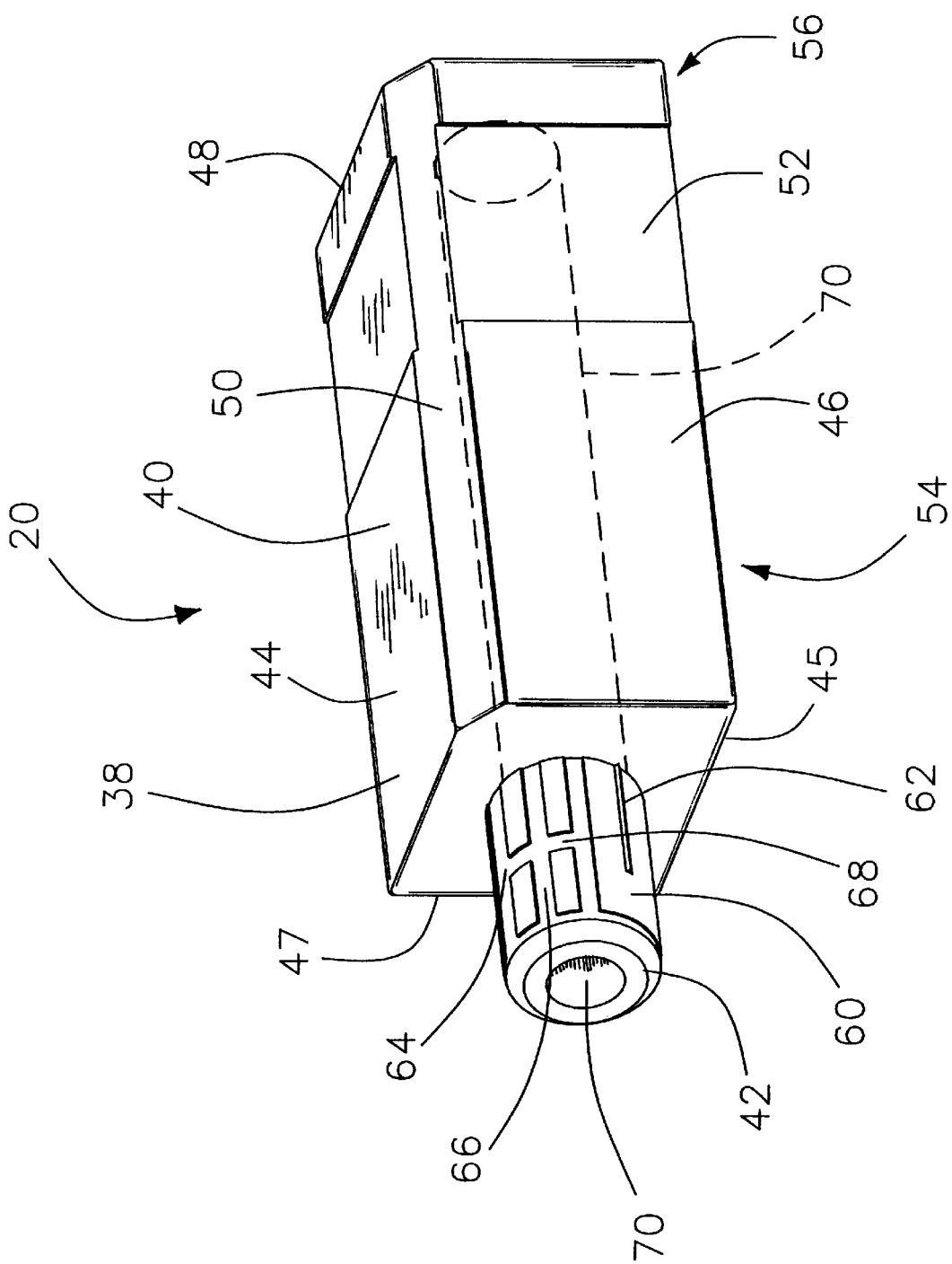
FIG. 2 is an enlarged perspective view of the mount shown in FIG. 1

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

Referring to FIG. 1, a mount 20 is illustrated in accordance with a preferred embodiment of the present invention for interposition between an exemplary electrode holder 22 and an exemplary metal burning electrode 24 for electrical discharge machining. As is conventional, the exemplary electrode holder 22, which may be one commercially available from EROWA, includes a rectangular opening 26 whose degree of opening is controlled by a clamp 28 selectively positioned by a set screw 30. The electrode holder 22 may include a second set screw 31 having a rounded tip end for contacting and engaging the mount 20. It will be understood to those in the art that the holder 22 may be secured on a servo-actuated ram (not shown) of an electrical discharge machine (not shown). The exemplary metal burning electrode 24 includes a conductive body 32 having patterned face 34 for imparting an inverse image on a metal workpiece (not shown) and a cylindrical hole 36 drilled or formed therein for receiving the mount 20.

In accordance with the present invention, the mount 20 includes a conductive cast body 38 having a shank 40 for connection to the electrode holder 22 and a connector portion or tip 42 for connection to the metal burning electrode 24. The mount 20 is formed from molten metal in a split die or mold (not shown) by pressure casting or other acceptable casting process. The body 38 is preferably cast from relatively soft inexpensive conductive metal such as aluminum material or zinc material, or other appropriate material. It is a significant advantage that the casting process and the material used in the mount 20 results in a mount 20 that is very inexpensive to commercially manufacture.

Referring in greater detail to the cast body 38, the shank 42 is sized to be received by the rectangular opening 26 of the electrode holder 22. The shank 42 includes first and second parallel side walls 44, 45, third and fourth parallel side walls 46, 47 and a base wall 48. The first and second side walls 44, 45 are disposed perpendicularly with the third and fourth side walls 46, 47. The base wall 48 is disposed generally perpendicular with the side walls 44–47. A beveled surface 50 that aligns parallel to the engaging face of the clamp 28 connects the first and third side walls 44, 46.

When the mount 20 is clamped into the electrode holder 22, the beveled surface 50 is engaged by the clamp 28 to secure the shank 40 within the rectangular opening 26. The shank 40 may include an intermediate recess 52 cast into each of the side walls 44–47 dividing the shank portion into upper and lower portions 54, 56. Advantageously, the recess 52 can increase the number of contact points between the electrode holder 22 and the mount 20 to prevent the mount 20 from rocking or pivoting within the rectangular opening 26. More specifically, the intermediate recess 52 ensures that the side walls 44–47 of the shank 42 will contact the planar surfaces of the rectangular opening 26 in either the upper portion 54, the lower portion 56, or both, which prevents an intermediate pivot point. This better fixes the position of the electrode 24 relative to the holder 22 thereby ensuring high precision when burning workpieces with the metal burning electrode 24. The recess 52 does not need to be deep to provide these advantages and for a two inch long and ½ inch wide mount 20, for example, the recess may have a depth of between about $\frac{1}{1000}$ and $\frac{5}{1000}$ of an inch, or other appropriate depth depending upon the application.

In the present embodiment, the tip 42 has a cylindrical outer peripheral gluing surface 60 that is sized to be closely received by the cylindrical hole 36 in the metal burning electrode 24 and is preferably just smaller than the cylindrical hole 36 to allow glue such as adhesive or epoxy to bond therebetween. When it is desired to attach the mount 20 to an electrode 24, the tip 42 along with glue such as adhesive or epoxy is inserted into the formed hole 36 in the electrode 24 to rigidly fix the mount 20 to the electrode 24.

In accordance with an aspect of the present invention, the cylindrical gluing surface 60 includes at least one and preferably a plurality of relatively thin, deformable ears 62 formed during the casting process, and projecting outwardly from the surface 60. The radius of the ears 62 is sized slightly larger than the radius of the formed hole 36 in the electrode 24. For a two inch long mount 20 with a ⅜ inch diameter tip, for example, the outer radius of the ears may be approximately zero to approximately ³⁄₁₀₀₀ of an inch larger than the radius of the hole 36 accounting for manufacturing tolerances in the tip 42 and the hole 36 with an ear width of about one to a few thousandths of an inch. It will be understood, however, that other dimensions for the ears may be used as appropriate. When the tip 42 of the mount 20 is inserted into the hole 36 in the electrode 24, the ears may deform but will stay in good electrical contact with the inner surface of the hole 36 to ensure good electrical contact between the mount 20 and the metal burning electrode 24. Advantageously, the ears 62 prevent the glue such as adhesive or epoxy that is used to rigidly secure the mount 20 to the electrode 24 and generally acts as an insulator from causing poor electrical contact therebetween. The softness of the cast metal, which as mentioned is preferably aluminum material or zinc material, allows the mount 20 to be easily tapped into the hole 36 of the electrode 24 with the ears 62 easily deforming. Advantageously, the relatively soft easily deformable ears prevents soft electrodes such as graphite electrodes from breaking when the mount 20 is inserted therein.

The gluing surface 60 may also include grooves 64 formed during the casting process for catching glue. The tip 42 includes both axial grooves 66 and radial grooves 68. The grooves 64 increase the axial strength and radial shear strength of the glue bond between the mount 20 and the electrode 24 thereby better ensuring high precision during the EDM process and preventing the electrode 24 from coming loose or dislodging from the mount 20 which could otherwise destroy the workpiece and require time consuming re-affixing of the electrode to the mount.

As seen in the Figures, the mount 20 may include an axial fluid passage 70 extending through the base wall 48, the shank 40 and the tip 42. The electrode 24 may include a small through hole 72 aligned with the fluid passage 70 of the mount 20 and extending from the receiving hole 36 to the patterned face 34. This allows the operator to flow dielectric fluid through the holder 22, the axial passage 70 in the mount 20 and the through hole 72 in the electrode 24 during the EDM process to more effectively cool, solidify and flush away eroded metal particles from the workpiece. It is another aspect of the present invention that base wall 48 may include an annular raised lip 74 (FIGS. 3 and 5) cast thereon surrounding the axial passage 70. The raised lip 74 seats on the bottom of the rectangular opening 26 and seals the mount 20 to the electrode holder 22 for dielectric fluid flow therethrough to better prevent leakage of dielectric fluid between the mount 20 and the electrode holder 22.

Figure 6:
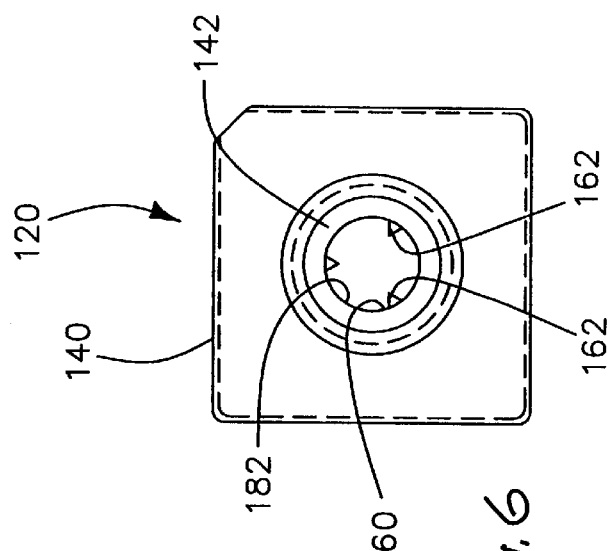
FIG. 6 is a top view of a mount according to a first alternative embodiment.
Figure 7:
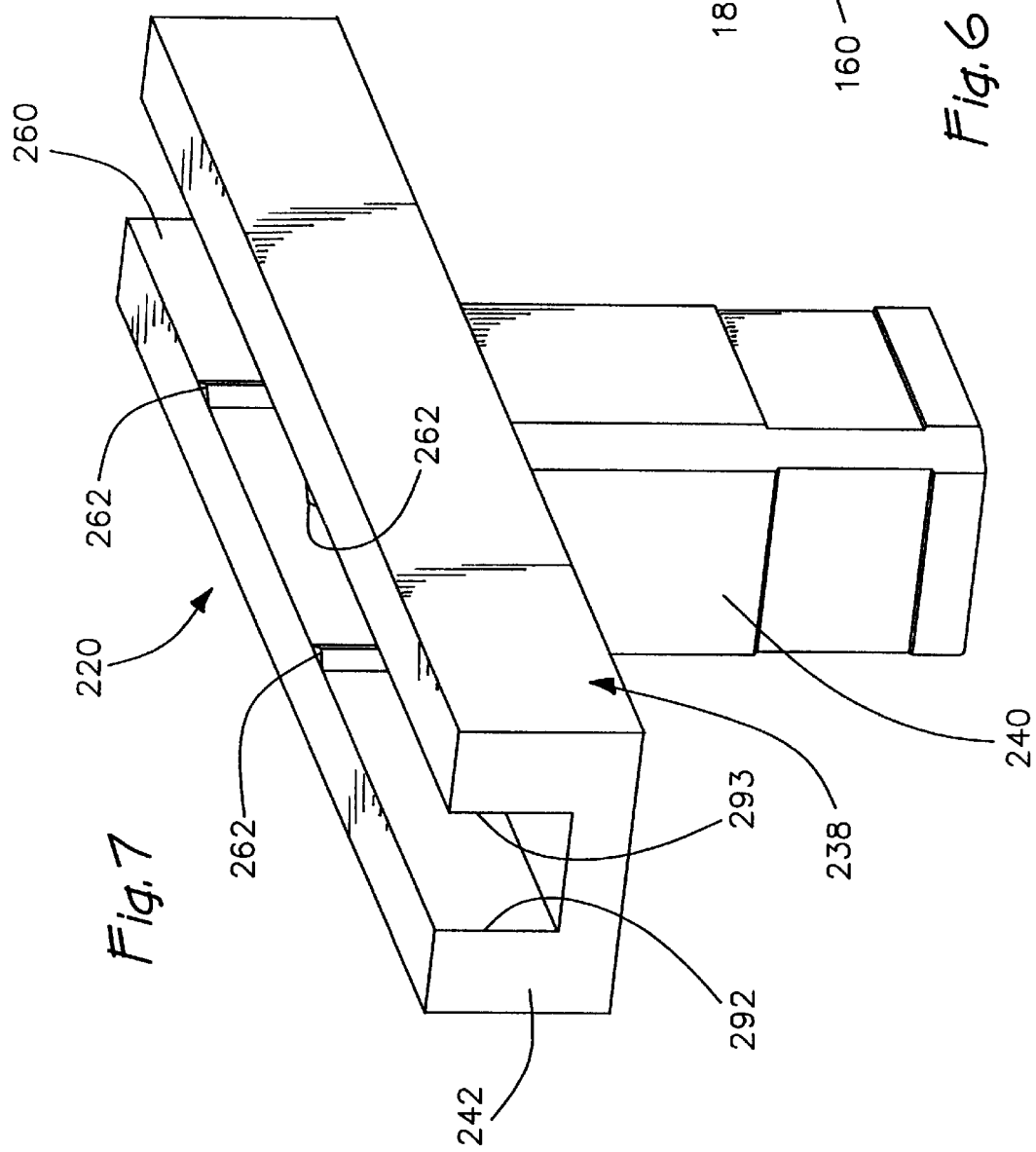
FIG. 7 is a perspective view of a mount according to a second alternative embodiment.

Turning to the alternative embodiments of FIGS. 6 and 7 it is seen that various features of the present invention may be applied to several other types of mounts 120, 220 formed by a casting process for holding different types, sizes and shapes of metal burning electrodes. It will be appreciated by those skilled in the art that the sizes and dimensions described herein are used for better explaining the disclosed embodiments and that the sizes and dimensions may be adapted as desired for the particular application and the particular materials, shapes, sizes of the electrode and electrode holder.

Referring to FIG. 6, the mount 120 includes a conductive cast body 138 having shank 140 similar to the first embodiment and a tip 142. In this embodiment, the tip 142 includes a cylindrical opening 182 providing a cylindrical gluing surface 160 sized to closely receive a cylindrical stem portion of a small electrode (not shown) such as a pin shaped electrode for creating small holes in the workpiece. A plurality of deformable ears 162 cast into the tip 42 extended outwardly from the gluing surface 160 and in this case radially inward towards the center of the cylindrical opening 182. The ears 162 have a inner radius that is slightly smaller than the corresponding outer radius of the stem portion of the electrode (not shown) to ensure good electrical contact between the electrode and the mount 120. The gluing surface 160 may also include grooves (not shown) for receiving glue and increasing the glue bond strength between the electrode and the mount 120.

Referring to FIG. 7, the mount 220 includes a conductive cast body 238 having shank 240 similar to the first embodiment and a tip 242. In this embodiment, the tip 242 has a longitudinally extending slot 290 for receiving a flat or planar blade portion of a metal burning electrode (not shown). The slot has a gluing surface 260 provided by opposing parallel walls 292, 293 of the slot 290. The width of the slot 260 is dimensioned to closely receive the blade portion of the metal burning electrode therebetween. The mount 220 includes deformable ears 262 that project outwardly from the gluing surface 260. The width between the ears 262 and the opposing walls 292, 293 is slightly smaller than the width of the blade portion of the metal burning electrode to ensure good electrical contact between the mount 220 and the electrode when bonded together by glue. The gluing surface 260 may also include grooves (not shown) for receiving glue and increasing the glue bond strength between the electrode and the mount 220.

Although the preferred method of forming the mounts is casting, it may also be possible to, sinter stamp or forge the mounts from metal blanks if the method results in deformable ears on the gluing surface to maintain good electrical contact. Certain broader claims appended hereto are meant to include mounts formed by such less preferred methods.

Thus, there has been provided a cast mount for interposition between an electrode holder and a metal burning electrode for use in electrical discharge machining which fully satisfies the objects, aims, and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations that fall within the spirit and broad scope of the appended claims.

What is claimed is:

1. A mount for connecting a metal burning electrode to an electrode holder, the electrode holder having an opening and a clamp controlling the size of the opening, comprising a conductive body including a shank portion and a connector portion, the shank portion sized to be received in the opening of the electrode holder, the connector portion having a gluing surface dimensioned to cooperate with a corresponding surface of the metal burning electrode, and at least one deformable ear projecting outwardly from the gluing surface for ensuring electrical contact between the metal burning electrode and the mount, the at least one deformable ear dimensioned to deform in contact with the corresponding surface when the mount and the metal burning electrode are connected.

2. The mount of claim 1 wherein the body is formed of relatively soft metal material.

3. The mount of claim 2 wherein the body is formed of cast material.

4. The mount of claim 3 wherein the gluing surface includes a plurality of axial and radial grooves cast therein for receiving glue.

5. The mount of claim 3 wherein the shank portion includes first and second parallel side walls, third and fourth parallel side walls, and a base wall, the first and second side walls being disposed perpendicular with the third and fourth side walls, the base wall disposed perpendicular with the side walls.

6. The mount of claim 5 wherein the shank portion includes a recess disposed intermediate the side walls, the shank portion including contact points above and below the recess for contacting the electrode holder.

7. The mount of claim 5 wherein the body includes a fluid passage extending axially through the base wall, the shank portion and the connector portion for communicating dielectric fluid therethrough, the base wall including a raised lip cast into the body surrounding the fluid passage for preventing dielectric fluid leakage between the electrode holder and the mount.

8. The mount of claim 5 wherein the shank portion includes a beveled surface connecting the first and third side walls, the beveled surface adapted to cooperate with the clamp.

9. The mount of claim 3 wherein the body is a metal selected from the group comprising aluminum material and zinc material.

10. The mount of claim 1 wherein the connector portion includes a cylindrical tip having a cylindrical gluing surface.

11. The mount of claim 1 wherein the connector portion includes a tip having a longitudinally extending slot between first and second parallel slot walls, the slot walls providing a gluing surface.

12. A mount for connecting a metal burning electrode to an electrode holder, the electrode holder having a generally rectangular opening and a clamp controlling the size of the opening, comprising:

a conductive body formed of cast material, the body including a shank and a cylindrical tip;

the shank sized to be received in the rectangular opening of the electrode holder, the shank portion including first and second parallel side walls, third and fourth parallel side walls, and a base wall, the first and second side walls being disposed perpendicular with the third and fourth side walls, the base wall disposed perpendicular with the side walls; and the cylindrical tip dimensioned to be connected to the metal burning electrode.

13. The mount of claim 12 wherein the cylindrical tip includes a cylindrical gluing surface on the outer periphery thereof, the cylindrical surface sized to be closely received in a cylindrical hole in the metal burning electrode.

14. The mount of claim 13 wherein the cylindrical gluing surface defines at least one deformable ear projecting radially outward, the radius of the at least one deformable ear being sized larger than the radius of the cylindrical hole.

15. The mount of claim 13 wherein the cylindrical gluing surface has a groove cast thereon for receiving glue.

16. The mount of claim 12 wherein the cylindrical tip defines a cylindrical opening sized to receive a cylindrical stem of the metal burning electrode, the cylindrical opening having a cylindrical gluing surface.

17. The mount of claim 16 wherein the cylindrical gluing surface defines at least one deformable ear projecting radially inward toward the center of the cylindrical opening, the radius of the at least one deformable ear being sized smaller than the radius of the cylindrical stem.

18. The mount of claim 17 wherein the tip includes at least one deformable ear on at least one of the one of the slot walls, the deformable ear projecting outward to provide a width at the deformable ear that is smaller than the width of the blade portion.

19. The mount of claim 12 wherein the cast material is a metal selected from the group comprising aluminum based material and zinc based material.

20. A mount for connecting a metal burning electrode to an electrode holder, the metal burning electrode including a blade portion, the electrode holder having a generally rectangular opening and a clamp controlling the size of the opening, comprising:

a conductive body formed of cast material, the body including a shank and a tip;

the shank portion sized to be received in the rectangular opening of the electrode holder, the shank portion including first and second parallel side walls, third and fourth parallel side walls, and a base wall, the first and second side walls being disposed perpendicular with the third and fourth side walls, the base wall disposed perpendicular with the side walls; and the tip having a longitudinally extending slot having first and second parallel slot walls, the slot walls being spaced to closely receive the blade portion therebetween.

21. The mount of claim 20 wherein the cast material is a metal selected from the group comprising aluminum based material and zinc based material.

* * * * *